Dec. 9, 1941.                K. FRITZ                2,265,833
            ULTRA SHORT WAVE OSCILLATORY CIRCUIT
                    Filed June 30, 1939
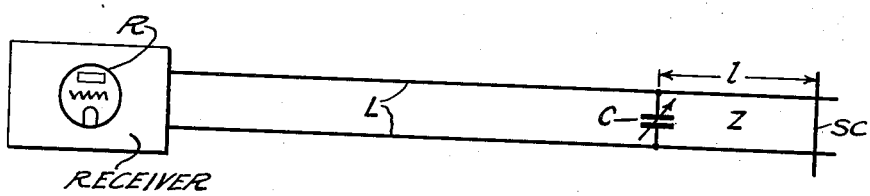
INVENTOR.
KARL FRITZ
BY
ATTORNEY.

Patented Dec. 9, 1941

2,265,833

UNITED STATES PATENT OFFICE 2,265,833

ULTRA SHORT WAVE OSCILLATORY CIRCUIT

Karl Fritz, Berlin, Germany, assignor to Telefunken Gesellschaft für Drahtlose Telegraphie m. b. H., Berlin, Germany, a corporation of Germany Application June 30, 1939, Serial No. 282,172
In Germany July 6, 1938

7 Claims. (Cl. 178—44)

The present invention is concerned with an oscillatory circuit, and particularly to an oscillatory circuit intended for use with ultra short waves and comprising a two wire circuit provided with such cross or shunt elements that it is in resonance at one and the same time for two different waves.

In some cases it is necessary to tune one and the same oscillatory circuit to different frequencies, especially frequencies which are an integral ratio to each other. For instance, this case arises in receivers adapted to ultra short waves which, for the sake of simplification of operation, work upon a wave which is a multiple of the signal wave.

The problem of causing an oscillatory circuit to oscillate at one and the same time at two independent waves, according to the invention, is solved in the following manner. A two-wire line is provided with a short-circuiting means and a further parallel reactance, the positions of the two cross members with respect to each other being so chosen that the line is in resonance for two independent frequencies.

The invention shall now be explained in more detail by reference to the appended drawing, whose single figure shows one embodiment of the present invention. In the drawing, R designates a vacuum tube of the above-mentioned receiver, for instance, the input tube. Connected to the tube, in a manner well known in the art, is a two-wire line L, a short circuiting means (bridge or strap) SC being provided at its end. There is also provided on the Lecher wire line a preferably variable capacity C which may be shifted along the line. The distance between the capacity and the short circuiting bridge SC is designated by $l$, and the surge impedance of the line of length $l$ is represented by Z. In order to fulfill the demand of having a condition of two-wave resonance of the Lecher wire line, the input admittance G at the connecting terminals of capacity C must fulfill two requirements at the same time. For the wave $\lambda_1$, it must have the value $G_1$ and for the wave $\lambda_2$ the value $G_2$ in order that the length of line $l$ may be in resonance together with the remainder of the Lecher wire system. Of the three quantities which may be chosen, that is, C, Z and $l$, two are always optionally available, that is, may be chosen at will. It is expedient to choose C and $l$. Fundamentally speaking, resonance tuning to three different waves may be obtained at the same time. For practical purposes, it is most favorable to place the condenser C at a voltage node of the shorter wave so that the tuning to the two waves may practically be independent of each other.

The value and location of capacity C which will produce resonance for the two waves $\lambda_1$ and $\lambda_2$ are those which satisfy the following equations:

$$\frac{2\pi v}{\lambda_1}ZC - \cot\frac{2\pi l}{\lambda_1} + \tan 2\pi\frac{L}{\lambda_1} = 0$$

$$\frac{2\pi v}{\lambda_2}ZC - \cot\frac{2\pi l}{\lambda_2} + \tan 2\pi\frac{L}{\lambda_2} = 0$$

where $v$ equals the velocity of light, $l$ the distance of the capacitor C from the short circuiting strap, Z the section of line between capacitor C and said strap, and L is the length of the two-conductor transmission line.

Instead of making the condenser C shiftable and variable at the same time, it may be fixedly connected on the Lecher wire system, and the short circuiting bridge may be made to be shifted. As mentioned above, the arrangement is especially favorable for receivers whose receiver tube, for instance, oscillates with a wavelength of 20 cm., while the signal wavelength amounts to 10 cm.

What is claimed is:

1. Oscillatory circuit adapted to ultra short waves, with the characteristic feature that a two-wire line is provided with a short-circuiting member and additionally with a parallel reactance member, the positions of the said two members with respect to each other as well as the size of the reactance being so chosen that the two-wire line is in resonance for two frequencies which are independent of each other.

2. Oscillatory circuit as claimed in claim 1, with the characteristic feature that the shunt reactance is placed at a voltage node of one of the waves, while its size is determined by the other wave.

3. A tuned circuit arrangement comprising a section of two-conductor transmission line, a short-circuiting strap across said line at one end thereof, and a variable reactance across said line at an intermediate point on said line, the value of said reactance and the distance of said reactance from said strap being such that said line has two independently adjustable degrees of freedom corresponding to two non-integrally related frequencies.

4. Resonant system arranged to provide, between a pair of terminals, anti-resonance at two non-integrally related frequencies comprising a two conductor transmission line having a pair of terminals at one end, a short circuit at the other end, and a reactance element connected across the line intermediate the two ends thereof, the magnitude of said element and the distance between said element and one end of the line being adjusted to make the two natural frequencies of the line coincide with said desired frequencies.

5. A tuned circuit arrangement comprising a section of two-conductor transmission line, a short-circuiting strap movably positioned across said line at one end thereof, and a variable capacitor across said line at an intermediate point on said line, the value of said capacitor and the distance of said capacitor from said strap being such that said line has two independently adjustable degrees of freedom corresponding to two non-integrally related frequencies.

6. A tuned circuit arrangement comprising a section of two-conductor transmission line, a short-circuiting strap across said line at one end thereof, and a variable reactance across said line at an intermediate point on said line, the value of said reactance and the distance of said reactance from said strap being such that said line has two independently adjustable degrees of freedom corresponding to two non-integrally related frequencies, said reactance being positioned across the conductors of said line at a voltage nodal point for the higher of the two natural frequencies.

7. A tuned circuit arrangement which is resonant at two arbitrary wavelengths $\lambda_1$ and $\lambda_2$, comprising a two-conductor transmission line L, a short-circuiting strap across said line at one end thereof, a translation device at the other end of said line, and a variable capacitor C placed across said line at a distance $l$ from said short circuiting strap, the section of said line between said capacitor C and said strap being Z, said elements L, $l$, C and Z being so chosen as to satisfy the following relations:

$$\frac{2\pi v}{\lambda_1}ZC - \cot\frac{2\pi l}{\lambda_1} + \tan 2\pi\frac{L}{\lambda_1} = 0 \qquad (1)$$

$$\frac{2\pi v}{\lambda_2}ZC - \cot\frac{2\pi l}{\lambda_2} + \tan 2\pi\frac{L}{\lambda_2} = 0 \qquad (2)$$

where $v$ equals velocity of light, whereby the input impedance is very high at both wavelengths $\lambda_1$ and $\lambda_2$ as measured at the terminals of said translation device.

KARL FRITZ.